United States Patent [19]

Gontowski

[11] Patent Number: 4,887,022

[45] Date of Patent: Dec. 12, 1989

[54] UNDER VOLTAGE LOCKOUT CIRCUIT FOR SWITCHING MODE POWER SUPPLY

[75] Inventor: Walter S. Gontowski, Thompson, Conn.

[73] Assignee: Cherry Semiconductor Corporation, East Greenwich, R.I.

[21] Appl. No.: 359,513

[22] Filed: Jun. 1, 1989

[51] Int. Cl.⁴ .............................................. G05F 1/46
[52] U.S. Cl. .................................... 323/284; 323/299; 323/316; 323/901; 330/278; 330/298
[58] Field of Search ............... 323/282, 284, 285, 299, 323/313–317, 901; 330/257, 278, 288, 296, 298

[56] References Cited

U.S. PATENT DOCUMENTS

| | | | |
|---|---|---|---|
| 3,787,757 | 1/1974 | Sheng | 323/901 |
| 4,333,047 | 6/1982 | Flink | 323/901 |
| 4,476,428 | 10/1984 | Iwasawa et al. | 323/316 |
| 4,567,426 | 1/1986 | van de Plassche et al. | 323/315 |
| 4,574,232 | 3/1986 | Petty | 323/901 |
| 4,740,742 | 4/1988 | Gontowski, Jr. | 323/901 |
| 4,837,496 | 6/1989 | Erdi | 323/316 |

Primary Examiner—Peter S. Wong
Attorney, Agent, or Firm—Robert M. Asher; Henry D. Pahl

[57] ABSTRACT

The under voltage lockout circuit disclosed herein is useful in a switching mode power supply of the type which, in operation, powers its own regulator circuitry. The lockout circuit operates to inhibit energization of the power supply; including its own regulator, until a voltage reference is established which can control the operation of a comparator which monitors the supply voltage available to the regulator circuitry.

10 Claims, 1 Drawing Sheet

UNDER VOLTAGE LOCKOUT CIRCUIT FOR SWITCHING MODE POWER SUPPLY

BACKGROUND OF THE INVENTION

The present invention relates to an under voltage lockout for switching mode power supplies and more particularly to a lockout circuit which greatly reduces initial current drain from an energy storage capacitor until the voltage on that storage capacitor has reached a level to enable complete starting of the power supply and regulator.

In switching mode power supplies, it is common for the power supply to itself provide the power for energizing the associated regulator and control circuitry. As is understood it is therefor necessary to provide some sort of circuit which initiates operation of the system from a separate current source. Typically, rectified line voltage is applied to charge a capacitor which can hold enough energy to sustain the initial operation of the power supply until its output circuit can generate enough power to sustain the regulator and control circuitry. Typically also, the storage capacitor is charged through a resistor from the rectified line voltage. If the regulator and start-up circuit draw significant current from the capacitor during the initial charging, the charging must, in effect, proceed against this load and substantial dissipation can develop in the dropping resistor.

It has heretofore been recognized as advantageous to delay energization of the band-gap regulator typically associated with switching mode power supplies, such an expedient being, for example, disclosed in my earlier U.S. Pat. No. 4,740,742 issued on Apr. 26, 1988 and entitled Voltage Regulator Start-Up Circuit. In such prior art systems, the voltage on the storage capacitor was typically monitored by a comparator which operated to inhibit operation of the band-gap regulator until the voltage on the capacitor exceeded a pre-selected threshold. The same comparator was typically utilized to shut the power supply down if the output voltage dropped below a given level, i.e. in order to protect the power supply circuitry or its load. As is understood by those skilled in the art, the comparator itself necessarily draws some current from the storage capacitor thus slowing its charging or, conversely, requiring a heavier charging current causing more dissipation in the dropping resistor.

While the circuit of the present invention includes a comparator which is responsive to supply voltage, the comparator circuit itself is kept de-energized while the storage capacitor is initially charging. Essentially, the only current taken from the storage capacitor during charging is directed toward energizing a voltage reference which provides a reference voltage for the comparator. Only when the voltage reference is energized is the comparator switched into an operative state.

Among the several objects of the present invention, it may be noted the provision of a novel under voltage lockout circuit for a switching mode power supply; the provision of such a start-up circuit which requires minimal current to charge up a storage capacitor; the provision of such a circuit which substantially reduces power dissipation; the provision of such a circuit which is highly reliable and which is of relatively simple and inexpensive construction. Other objects and features are in part apparent and in part pointed out hereinafter.

SUMMARY OF THE INVENTION

The under voltage lockout circuit of the present invention is useful in connection with a switching mode power supply which, in operation powers its own regulator circuitry. Associated with the start-up circuitry is a means, including a capacitor, for temporarily providing starting current. A comparator is utilized which has a first state in which the regulator is enabled, and a second state in which the regulator is disabled and does not draw power, switching between states being controlled by a control voltage. Switch means are provided for selectively connecting the comparator across the capacitor and a voltage divider connected to the capacitor is operative to provide the control voltage when the comparator is energized. The start-up circuitry also utilizes a voltage reference which conducts when the voltage applied reaches an essentially predetermined value and this reference is interconnected with the switch means to initiate energization of the comparator when conduction occurs in the reference. A current gain means such as a current mirror biases the voltage reference. The current flowing in the divider is applied to the current gain means when the comparator is disconnected. Accordingly, until the reference conducts, essentially all current drawn from the storage capacitor is applied to the reference and the current gain means.

BRIEF DESCRIPTION OF THE DRAWING

The single figure is a schematic circuit diagram of a power supply under voltage lockout circuit constructed in accordance with the present invention.

DESCRIPTION OF THE PREFERRED EMBODIMENT

Figure 1:
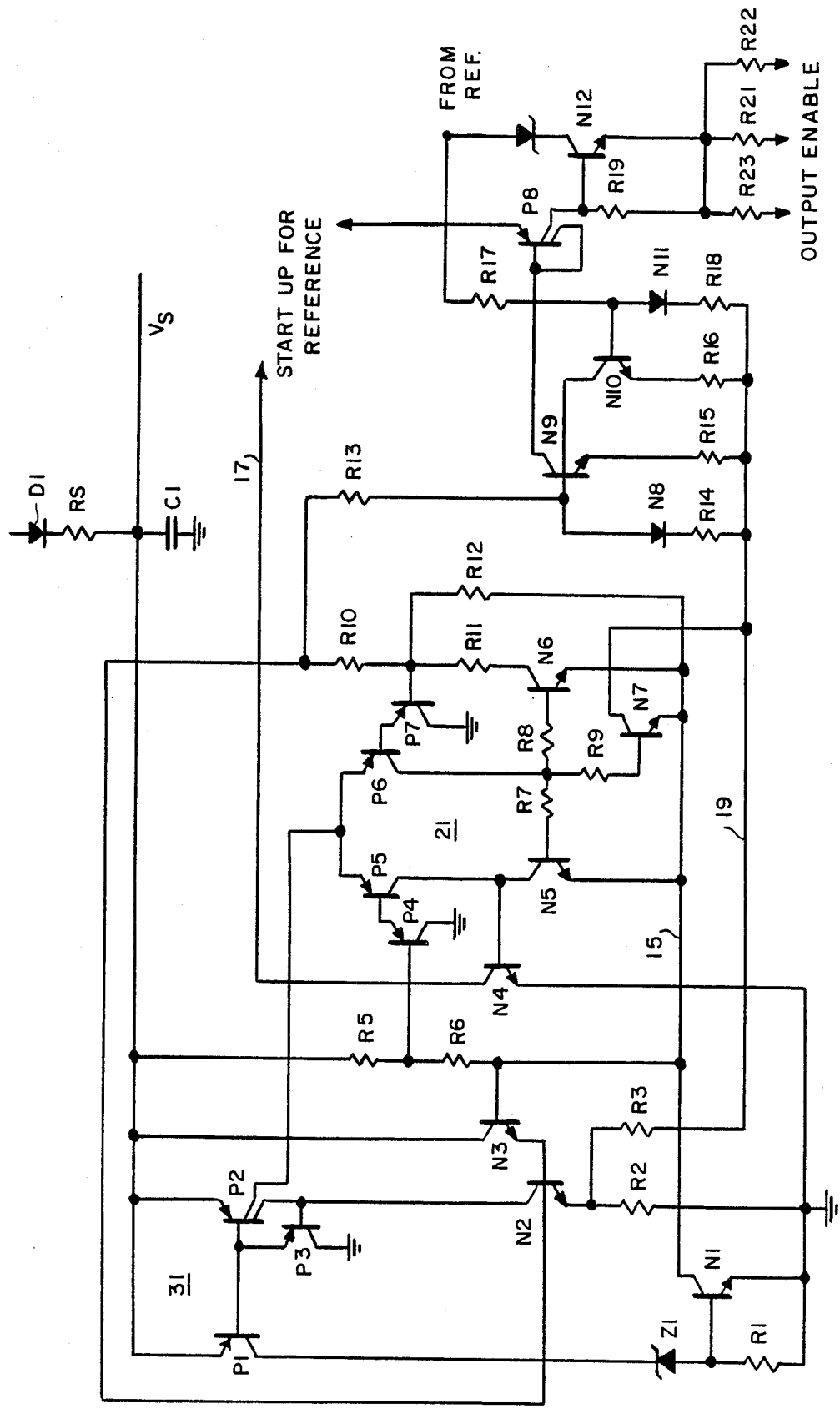

Referring now to the drawing, the internal supply line for the regulator, under voltage lockout and start-up circuitry is designated by reference character 11. This line is normally provided with current at a suitable voltage, e.g. twenty volts, from the power supply output stages, as indicated, once normal operation is obtained. Band-gap regulator circuitry, e.g. as described in previously identified U.S. Pat. No. 4,740,742, is indicated generally by reference character 12.

A storage capacitor is provided as indicated at C1. With the regulator and other control circuitry incident to the switching mode operation turned off, storage capacitor C1 can be charged from line voltage via a diode D1 and a resistor RS.

As is conventional, the system incorporates a comparator for shutting down the power supply when the output voltage drops below a preselected level. This comparator circuitry is indicated generally by reference character 21 and comprises four PNP transistors P4-P7 interconnected in an emitter coupled configuration. An essentially constant current is applied to the common emitter connection of transistors P5 and P6 from one of the collectors of a PNP transistor P2. Transistor P2 is part of a current mirror circuit as described in greater detail hereinafter.

It is appropriate to initially describe how the comparator works once the power supply is in normal operation and to then describe how the comparator operates during start-up. The operation of comparator 21 is essentially to switch between a pair of states depending upon relative values of the voltages present at the base terminals of transistors P4 and P7. During normal operation, a portion of the voltage appearing across an energized Zener diode Z1 is applied, by a voltage divider comprising resistors R10 and R12, to the base of transistor P6 while a portion of the internal supply voltage is applied to the base transistor P4 by voltage divider comprising resistors R5 and R6. The voltages at the collector circuits of transistors P5 and P6 essentially indicate the state of the comparator. However, rather than being directly returned to ground, the collector currents from these transistors proceed to an intermediate lead 15 which is selectively grounded by connection through a transistor N1.

During normal operation, transistor N1 is conducting so that the comparator operates as described as follows: When the supply voltage is above the selected cutoff point, i.e. when the voltage at the base of transistor P4 is more positive than that at the base of transistor P7, P6 conducts and P5 does not. Accordingly, the transistor N4 will also be cut off. The collector of transistor N4 constitutes the output signal from the comparator and this collector is connected, through a line 17, to the switching mode regulator circuitry, the regulator circuitry being enabled when transistor N4 is off or non-conducting.

As transistor P6 also conducts during this first state, transistor N7 will likewise conduct. Conduction through transistor N7 effectively grounds a line 19 which essentially energizes certain current mirror circuitry as described in my previously issued patent U.S. Pat. No. 4,740,742. This current mirror circuitry operates in conjunction with the band-gap regulator circuitry described in previously identified U.S. Pat. No. 4,740,742.

Zener diode Z1 is biased with an essentially constant current derived from a current mirror circuit comprising three PNP transistors P1–P3. The current drive for the current mirror is obtained from an NPN transistor N2, the value of the drive current being determined by a resistor R2 in the emitter circuit of transistor N2. During operation an essentially constant voltage is applied to the base of transistor N2 from the Zener diode Z1. Conduction through the Zener diode Z1 also turns on the transistor N1 which essentially grounds the line 15 as described hereinbefore so that the comparator 21 is energized.

While conduction through transistor N2, through the current mirror of transistors P1–P3 and through the Zener diode Z1 forms a self-sustaining loop during normal operation as described hereinbefore, it will also be understood that an initiating current will need to be applied in order to start this cycle of conduction. In accordance with one aspect of the present invention, this initiating current is obtained through a transistor N3, the base of which is connected to the voltage divider comprising resistors R5 and R6 and also to the line 15.

It is an important advantage of the arrangement of the start-up circuitry of the present invention that essentially the only current drawn from the storage capacitor C1 during start-up is that which is required to initiate conduction through the voltage reference and that components which have other uses in the system are employed for applying that current. Considering now the operation of the circuitry illustrated during start-up, it should be understood that, initially, there is no conduction through transistor N1 and thus the comparator circuitry 21 is essentially disconnected from across the storage capacitor. As the voltage across the storage capacitor rises, initial conduction occurs essentially only through the resistors R5 and R6 and this conduction passes not through the transistor N1 via the lead 15, but rather into the base terminal of transistor N3 and then into the base terminal of transistor N2. Because of the available loop gain initiated, additional current flow is thus available to the Zener diode once the voltage at the base of N2 reaches the Zener threshold and conduction through transistor N2 is initiated. During this initial phase of operation, not only is the switching mode regulator turned off but even the comparator 21 is not itself consuming any power other than that flowing through the voltage dividers and that current is to be utilized to effect the turning on of the voltage reference.

Once conduction is initiated through the Zener diode Z1, the transistor N1 is turned on thereby pulling the line 15 to ground potential and energizing the comparator 21. Assuming that the voltage on capacitor C1 has reached a sufficient value, the comparator 21 will assume a state in which the switching mode regulator is energized and the transistor N7 is turned on so that the line 19 is also brought essentially to ground potential, enabling the current mirror circuitry 31 as described previously with reference to U.S. Pat. No. 4,740,742. With the comparator 21 in its "enabling" state, transistor P6 will also turn on transistor N6 which switches resistor R11 into an essentially parallel relationship with voltage divider resistor R12. The addition of this additional resistor (R11) introduces hysteresis by changing the proportion of the Zener voltage which appears at the base of transistor P7. There is thus a different voltage threshold switching from one state to the other than in switching back. Accordingly, even through the capacitor C1 will be somewhat discharged before the switching mode power supply and come up to full operation and maintain the desired supply voltage on line 11, the state of the comparator will not reverse unless the supply voltage drops to a substantially lower level, i.e. that determined by the value of resistor R11 in relation to the values of resistors R10 and R12. As is conventional, that threshold or switching point is chosen at a level appropriate to protect the power supply and its loads from too low an output voltage.

From the foregoing, it can be seen that the start-up circuitry of the present invention provides a very advantageous mode of operation in which minimal current is drawn from the storage capacitor until it reaches a voltage level which will allow the power supply and its regulator to be started. Further, the start-up circuitry providing this advantageous mode utilizes to a substantial extent circuit components which were already required for known functionality, i.e. under voltage protection.

In view of the foregoing it may be seen that several objects of the present invention are achieved and other advantageous results have been obtained.

As various changes could be made in the above constructions without departing from the scope of the invention, it should be understood that all matter contained in the above description or shown in the accompanying drawings shall be interpreted as illustrative and not in a limiting sense.

What is claimed is:

1. An under voltage lockout circuit for a power supply which, in operation, powers its own regulator circuitry, said circuit comprising;

means including a capacitor for temporarily providing starting current for the regulator circuitry;

a comparator having a first state in which the regulator is enabled and a second state in which the regulator is disabled and does not draw power, switching between states being controlled by a control voltage;

switch means for selectively connecting said comparator across said capacitor thereby to energize the comparator;

a voltage divider connected to said capacitor and operative when said comparator is energized for providing said control voltage thereto;

a voltage reference which conducts when the voltage applied reaches an essentially predetermined value, said reference being interconnected with said switch means to initiate energization of said comparator when conduction occurs in said reference; and means for biasing said reference, the current flowing in said divider being applied to said biasing means when said comparator is disconnected whereby, until said reference conducts, essentially all current drawn from said capacitor is applied to said reference and said biasing means.

2. A lockout circuit as set forth in claim 1 wherein said reference is a Zener diode.

3. A lockout circuit as set forth in claim 2 wherein said biasing means provides gain increasing the current available for energizing said diode once conduction initiates.

4. A lockout circuit as set forth in claim 3 wherein said biasing means comprises a current mirror providing an input circuit and an output circuit which energizes said Zener diode with a current which is proportional to a current applied to the input circuit.

5. A lockout circuit as set forth in claim 4 further comprising transistor means for applying an input current to said current mirror, the current flowing in said divider being applied to said transistor means when comparator is disconnected from said capacitor.

6. A lockout circuit as set forth in claim 2 wherein said switch means comprises a transistor which is turned on by conduction through said Zener diode.

7. An under voltage lockout circuit for a switching mode power supply which, in operation, powers its own regulatory circuitry, said circuit comprising;

means for temporarily providing starting current for the regulator circuitry including a capacitor and a resistor through which said capacitor is charged;

a comparator having a first state in which the regulator is enabled and a second state in which the regulator is disabled and does not draw power, switching between states being controlled by a control voltage;

transistor switch means for selectively connecting said comparator across said capacitor thereby to energize the comparator;

a voltage divider connected to said capacitor and operative when said comparator is energized for providing said control voltage thereto;

a voltage reference Zener diode which conducts when the voltage applied reaches an essentially predetermined value, said reference being interconnected with said transistor switch means so that conduction through said Zener diode drives said transistor switch means to initiate energization of said comparator when conduction occurs in said diode; and current gain means for biasing said reference, the current flowing in said divider being applied to said current gain means when said comparator is disconnected whereby, until said reference conducts, essentially all current drawn from said capacitor is applied to said reference and said gain means.

8. A lockout circuit as set forth in claim 7 wherein said biasing means comprises a current mirror providing an input circuit and an output circuit which energizes said Zener diode with a current which is proportional to a current applied to the input circuit, said start-up circuit further comprising transistor means for applying an input current to said current mirror, the current flowing in said divider being applied to drive said transistor means when said comparator is disconnected from said capacitor.

9. An under voltage lockout circuit for a switching mode power supply which, in operation, powers its own regulatory circuitry, said circuit comprising;

means for temporarily providing starting current for the regulator circuitry including a capacitor and a resistor through which said capacitor is charged;

a comparator having a first state in which the regulator is enabled and a second state in which the regulator is disabled and does not draw power, switching between states being controlled by a control voltage;

transistor switch means for selectively connecting said comparator across said capacitor thereby to energize the comparator;

a voltage divider connected to said capacitor and operative when said comparator is energized for providing said control voltage thereto;

a voltage reference Zener diode which conducts when the voltage applied reaches an essentially predetermined value, said reference being interconnected with said transistor switch means so that conduction through said Zener diode drives said transistor switch means to initiate energization of said comparator when conduction occurs in said diode;

a second voltage divider connected with said Zener diode and operative when said comparator is energized for providing thereto a reference with which said control voltage is comprised; and current gain means for biasing said reference, the current flowing in said dividers being applied to said current gain means when said comparator is disconnected whereby, until said reference conducts, essentially all current drawn from said capacitor is applied to said reference and said gain means.

10. A lockout circuit as set forth in claim 9 wherein said biasing means comprises a current mirror providing an input circuit and an output circuit which energizes said Zener diode with a current which is proportional to a current applied to the input circuit, said start-up circuit further comprising transistor means for applying an input current to said current mirror, the current flowing in said divider being applied to drive said transistor means when said comparator is disconnected from said capacitor.

* * * * *

UNITED STATES PATENT AND TRADEMARK OFFICE
CERTIFICATE OF CORRECTION

PATENT NO. : 4,887,022
DATED : December 12, 1989
INVENTOR(S) : Walter S. Gontowski, Jr.

It is certified that error appears in the above—identified patent and that said Letters Patent is hereby corrected as shown below:

Column 1, line 7, after the word "lockout", please insert --circuit--.

Signed and Sealed this

Fifth Day of March, 1991

Attest:

HARRY F. MANBECK, JR.

*Attesting Officer*   *Commissioner of Patents and Trademarks*